Figure 1:
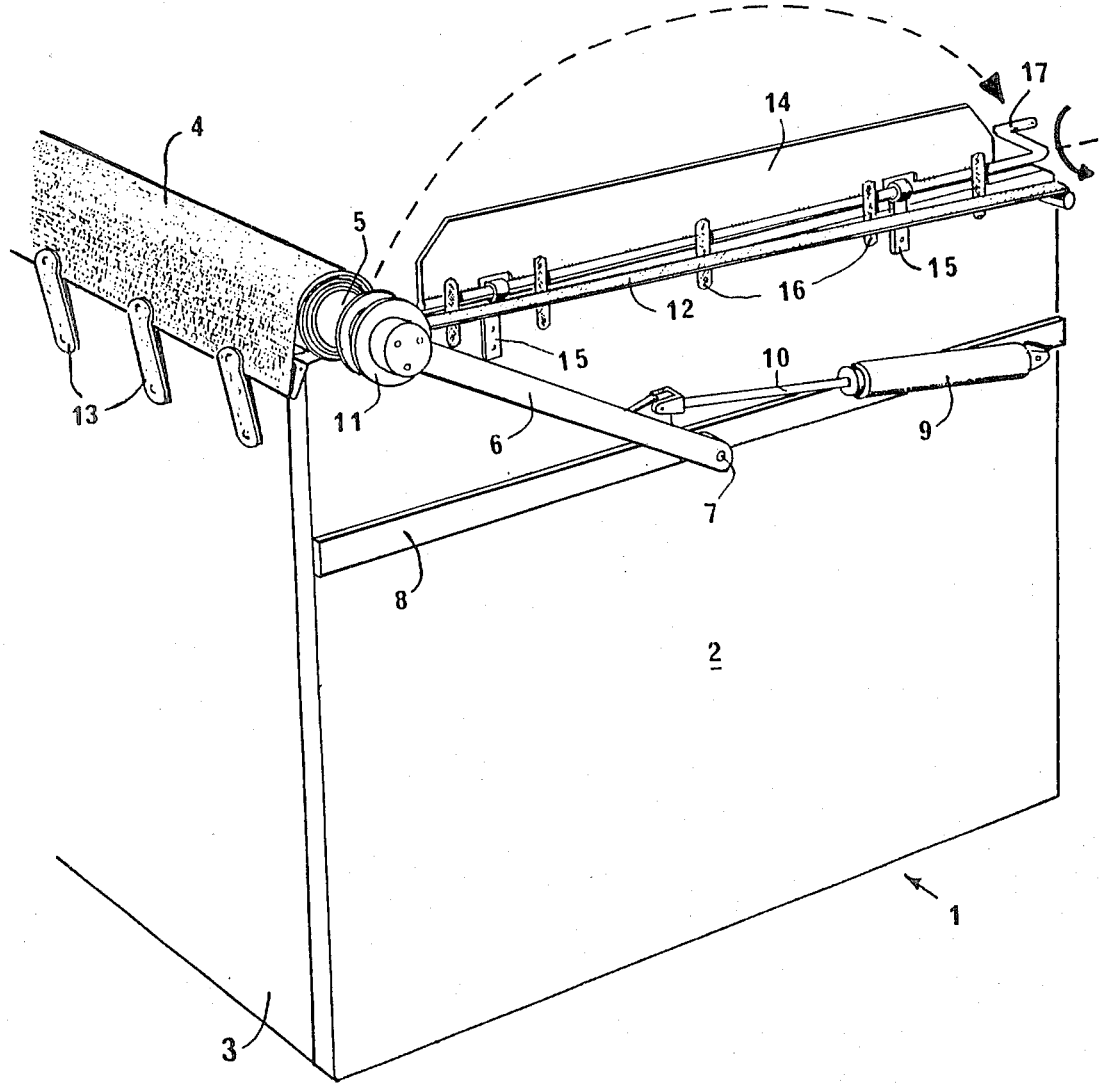

United States Patent [19]

Fredin

[11] 4,225,175
[45] Sep. 30, 1980

[54] ARRANGEMENT FOR COVERING A CHIP TRANSPORT BOX

[76] Inventor: Sture Fredin, VästansjöS-820 62 Bjuraker, Sweden

[21] Appl. No.: 7,210

[22] Filed: Jan. 29, 1979

[51] Int. Cl.³ .............................................. B60P 7/04
[52] U.S. Cl. ..................................... 296/98; 296/100; 160/68
[58] Field of Search ................ 296/98, 100, 101, 136; 105/377; 160/66, 67, 68, 311

[56] References Cited

U.S. PATENT DOCUMENTS

| | | | |
|---|---|---|---|
| 3,806,185 | 4/1974 | Brandjord | 296/98 |
| 3,977,719 | 8/1976 | Thurston | 296/98 |
| 4,050,734 | 9/1977 | Richard | 296/100 X |
| 4,126,351 | 11/1978 | Peteretti | 296/98 X |

Primary Examiner—John J. Love
Assistant Examiner—Norman Stack
Attorney, Agent, or Firm—Witherspoon & Hargest

[57] ABSTRACT

Arrangement for covering a chip transport box including a cover which is adapted to be rolled up on and unrolled from a shaft and a swinging arm provided at each of two opposite walls of the chip transport box whereby one end of the swinging arm is pivotally journalled at the respective wall and at least one piston and cylinder unit connected to at least one of the swinging arms and to said wall for swinging the swinging arms and for extending the cover across the chip transport box from one side thereof to the other. The swinging arms do in their other ends rotatably carry the shaft for swinging the same across the chip transport box when the swinging arms are actuated by the piston and cylinder unit, and a pull-belt has one end attached to the chip transport box and its other end is adapted to be rolled up on and unrolled from the shaft in a reversed mode relative to the rolling up of and the unrolling of the cover in order to bring about the movement of the shaft which causes the cover to be rolled up on and unrolled from the shaft when the swinging arms are operated. The cover is in one end thereof rigidly attached to the shaft and in its other end it is directly or indirectly fastened to one of the walls of the chip transport box and the cover includes resilient members which in the final stage of the unrolling of the cover are extended and which act with a tensioning force on the cover whereby this is brought to close contact with the upper edges of the chip transport box.

8 Claims, 7 Drawing Figures

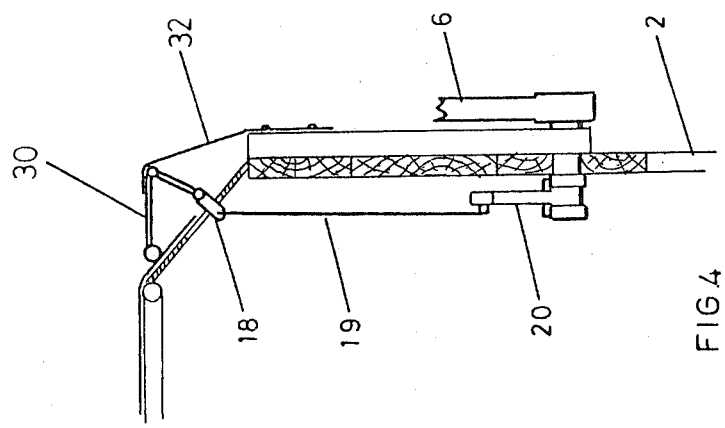
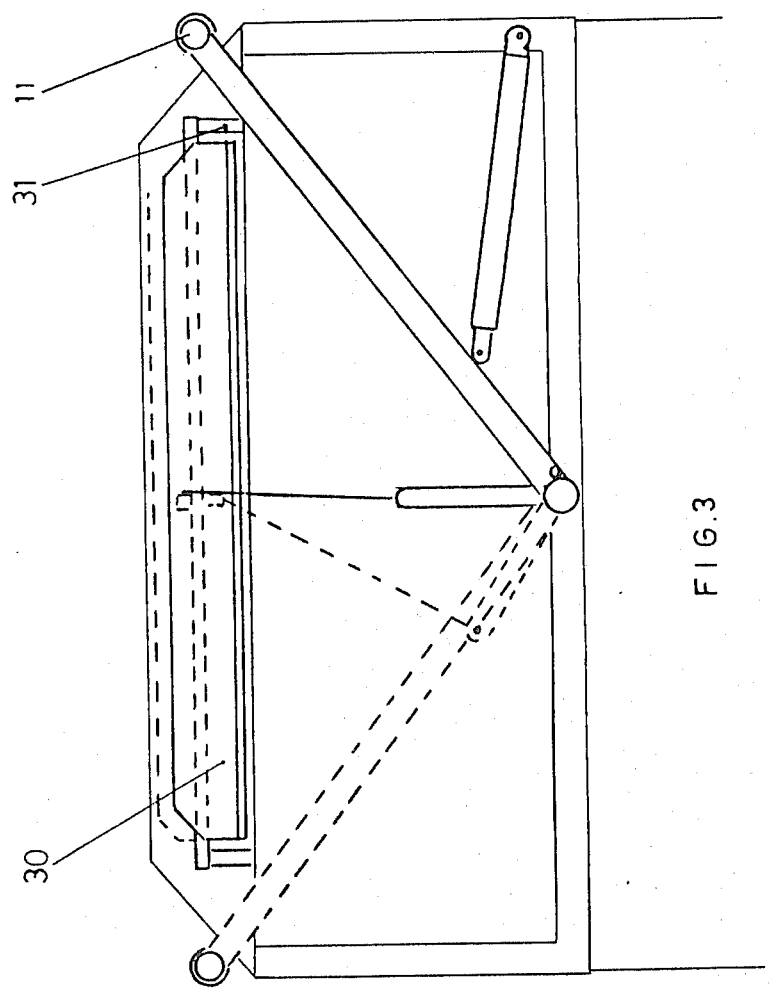

ARRANGEMENT FOR COVERING A CHIP TRANSPORT BOX

The present invention relates to transport devices and more exactly to an arrangement for covering transport boxes, especially chip transport boxes.

In transporting certain goods as chip, sawdust, cutter shavings, charcoal and the like boxes are used which are located on a truck platform, a trailor platform an so forth. These boxes are comparatively high and are fully open at the top.

During transport there is for that reason always a danger that portions of the load blow out from the box, which not only causes an unnecessary wastage of the transported goods but the material that whirls round can also contaminate the transport road and constitute a danger for the traffic especially along highways.

It has for those reasons been required that boxes for the transportation of such material must be covered to an extent that material cannot get out of the box. As has been mentioned the box is however provided with guite high walls and it is both dangerous and difficult to get up on top of the load in order to cover this by means for example a tarpaulin. Moreover it is very time consuming to perform such a covering by hand and it usually takes two persons to cover the box properly and since trucks are normally manned only by the driver this may be difficult to achieve.

Accordingly the object of the present invention is to eliminate the above mentioned difficulties. This object is attained with an arrangement of the kind indicated in the claims, from which also the special characteristics of the invention are clear.

Figure 2:
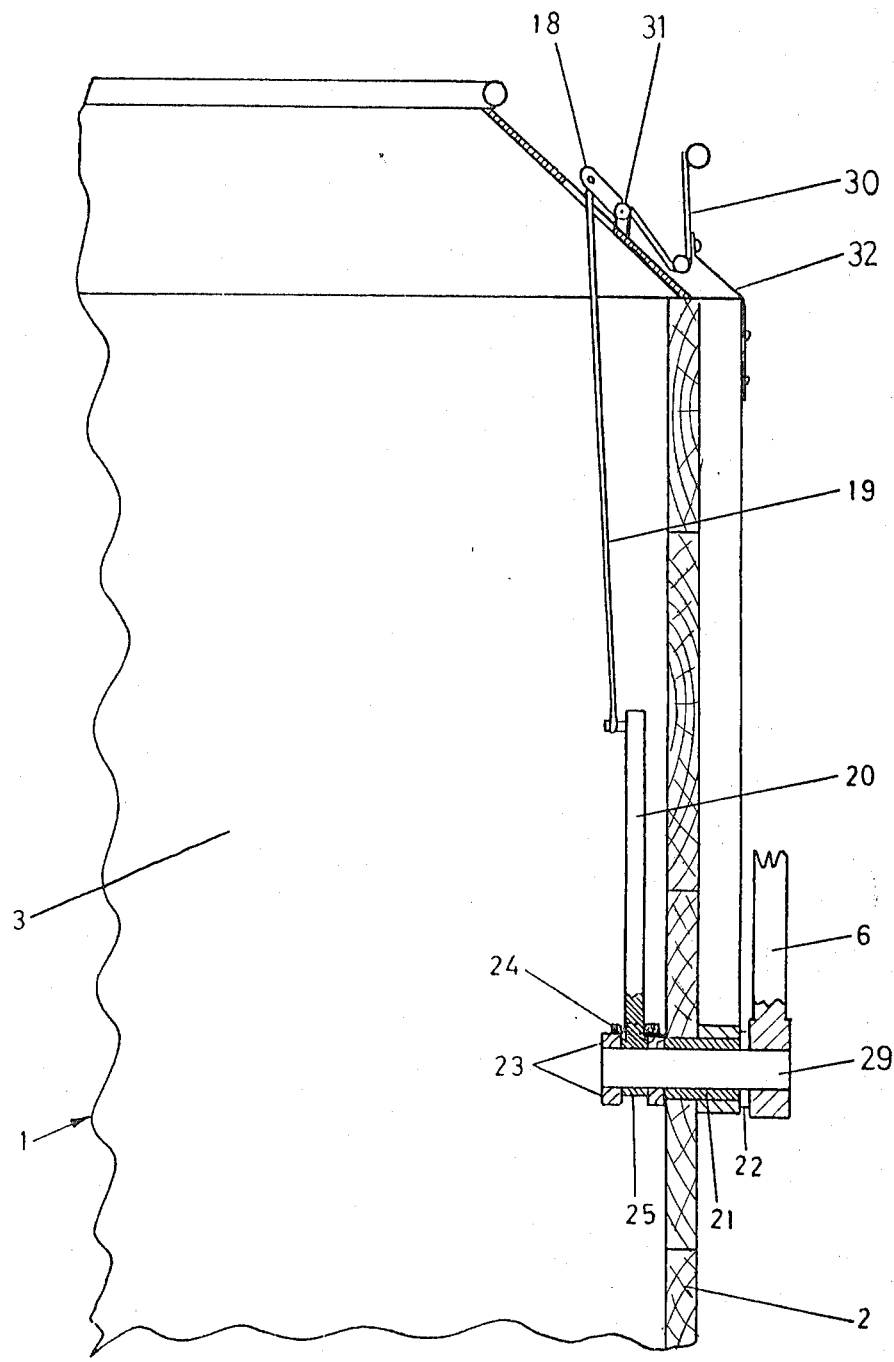
Figure 6:
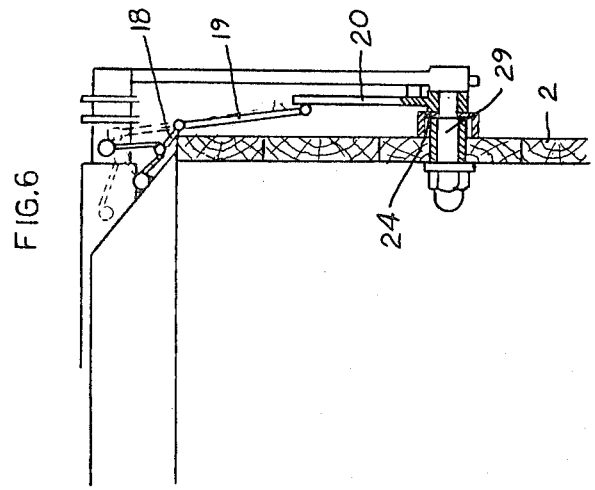
Figure 5:
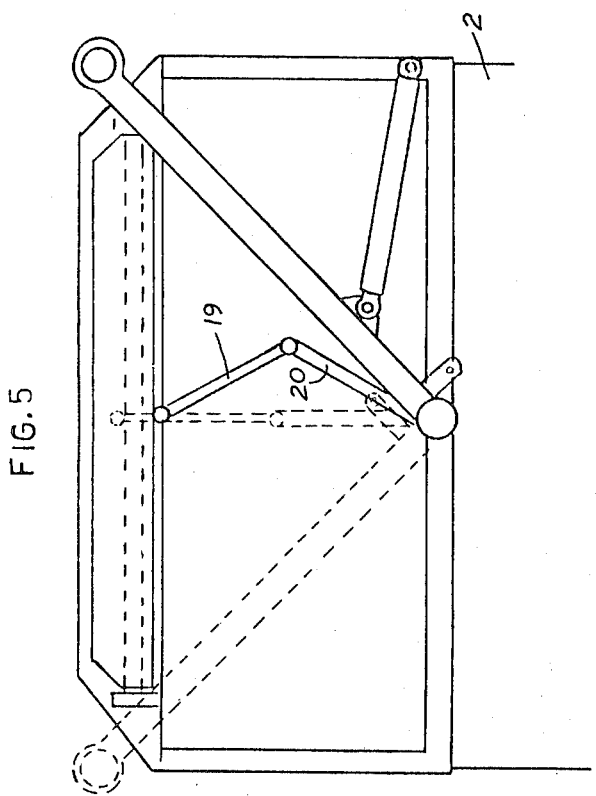
Figure 7:
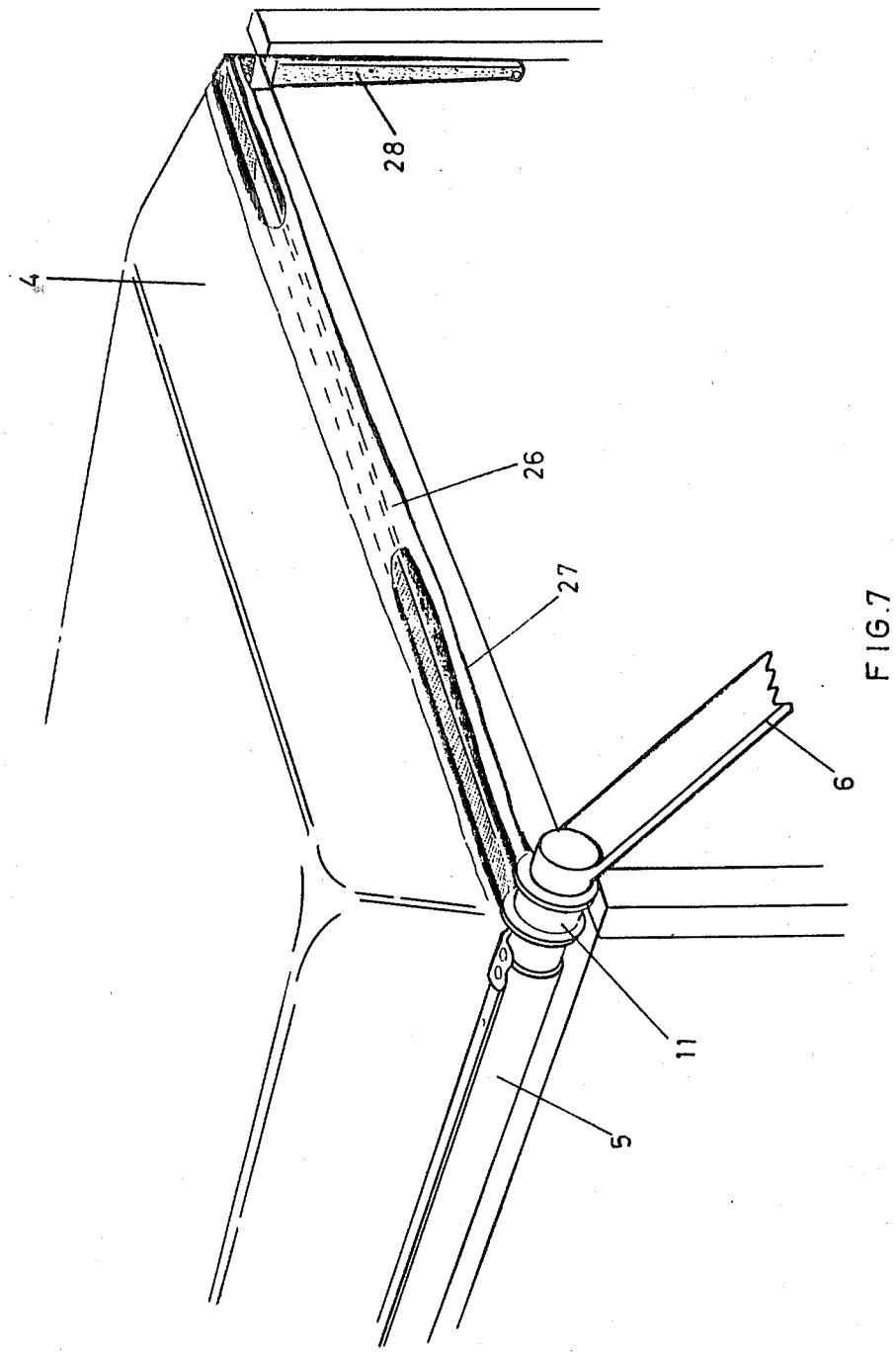

The invention is more clearly described below in connection to the enclosed drawings, in which FIG. 1 is a part-view in perspective showing one end of an engagement according to the present invention for covering a chip transport box which is only roughly indicated, FIG. 2 is a side-view, partly in section, of a second embodiment of the means for holding down the cover against the upper edge of the end-wall, FIG. 3 is a schematical front-view of the arrangement according to FIG. 2 with the end-wall of the chip transport box removed for purposes of clarity, FIG. 4 is a schematical side-view of the arrangement according to FIG. 2 in a holding position, FIGS. 5 and 6 show an arrangement similar to the one described in FIGS. 2-4, in which the operating means are arranged outside the end-wall of the chip transport box, and FIG. 7 is a perspective view of a third embodiment of the means for holding down the cover, with certain parts thereof cut off for purposes of clarity.

The chip transport box 1 consists of a box-shaped structure with two opposite end-walls of which one, 2, is shown in FIG. 1 and two opposite side-walls of which one, 3 is shown in FIG. 1. The bottom of the chip transport box 1 may consist of the vehicle platform on which the chip transport box is located but the box may also have its own bottom, especially if the box is intended for transportation of such material that could harm the truck platform.

The arrangement for covering the upwardly open top of the chip transport box 1 comprises a tarpaulin-like cover 4 which has the same length as the chip transport box 1 and which is attached to the upper edge of one of the side-walls 3 of the chip transport box. This cover 4 is when the chip transport box 1 is open for loading rolled up on a shaft 5 which extends along the full length of the chip transport box 1. This shaft 5 may be swung from one side-wall of the chip transport box 1 to the other, whereby the cover 4 is caused to cover and to uncover the chip transport box 1 respectively.

The shaft 5 is rotatably journalled in swinging arms of which one 6 is shown in the Figures, and which are swingingly connected, one to each end-wall 2. The swinging arms 6 are journalled in the end-wall 2 on shafts 7 which in turn are located in the middle of the end-walls 2 with reference to their width and at such a distance from their upper edges that the shaft 5 is swung from the upper edge of one of the side-walls 3 to the upper edge of the opposite side-wall. The pin 7 is fastened to a reinforcing beam 8 which extends along the full width of the end-walls.

A hydraulic or pneumatic piston and cylinder unit has its cylinder 9 swingingly attached to the beam 8 and its piston rod 9 swingingly attached to the swinging arm 6. It is in most cases quite sufficient to use only one piston and cylinder unit for each covering arrangement, that is it is quite sufficient for most applications if only one of the swinging arms 6 is driven.

A roll 11 which is firmly connected to the shaft 5 is provided at least at the bearing for the shaft 5 in one of the swinging arms 6. A pull-belt is fastened to the upper edge of the side-wall which is opposite the one to which the cover 4 is attached, and extends to the roll 11 where the other end of the belt 12 is fastened. When the cover 4 is rolled up on the shaft 5 the pull-belt 12 is unrolled from the roll 11 and when the cover 4 is unrolled and covers the chip transport box 1 the pull-belt 12 is wound on to the roll 11.

In the initial position, see FIGS. 1, 2 and the full lines in FIG. 3, the cover 4 is rolled up on the shaft 5 and the pull-belt 12 is unrolled from the roll 11. When pressure is applied to the piston in the cylinder 9 the piston rod 10 is forced into the cylinder 9 in the example shown in FIG. 1. This causes the swinging arm 6 to be swung over the chip transport box 1 while the cover 4 is simultaneously being unrolled and the pull-belt is being rewound. Thereby the cover will be raised over portions of the load which in the form of crests may extend above the edges of the chip transport box. When the shaft 5 approaches its terminal position for the covering a tensioning of the cover must be performed in order to prevent this from flapping and from being damaged by the wind caused by the speed of the vehicle. This tensioning can be accomplished by stretching the material in the cover itself or, as is shown in the drawing, by means of rubber straps 13 which resiliently retain a loop of the cover 4.

The rims of the cover overlap the upper edges of the end-walls. In spite of the tension in the cover 4 this can however, due to the speed of the vehicle, be forced away from the upper edge of the front (in the direction of travel) end-wall 2 and start to flap. Then there is a danger that the load whirls out of the box and that the cover is damaged. In order to prevent this the covering arrangement comprises a protective element which holds down the cover against the upper edge of the end-wall.

According to a first embodiment this protective element comprises an elongate plate or clack 14 which is arranged at the upper edge of the front (in the normal direction of transport) end-wall and which extends along this wall except for a short distance at each end thereof. The clack 14 is attached to the end-wall 2 by means of hinges 15 which permit swinging of the clack 14 inwardly over the chip transport box 1. Rubber straps 16 or other biasing means bias the clack to an upwardly swung position where it is out of the way for the cover 4 during the covering or uncovering of the upper-side of the chip transport box 1.

A bar 17 projects from the clack 14, to which it is fastened, preferably in alignment with the axis of the hinges for the clack, and the bar is at its free end bent inwardly towards the chip transport box 1, when the clack 14 is in its upwardly swung position. The bar 17 projects from the clack at the end thereof which is opposite the one at which the shaft 5 is positioned when the cover is rolled up on the shaft 5.

When the cover 4 is brought across the chip transport box 1 the shaft 5 will in the final stage engage the projecting bar 17 and will force the same downwardly. The clack 14 will then be swung down against the edge of the end-wall 2 and will clamp up the cover therebetween, and this prevents the cover from getting loose and flapping due to the speed of the vehicle.

Most chip transport boxes are provided with an inwardly-upwardly extended edge, that is the chip transport box is at its upper part shaped as a truncated pyramide. In that case the shaft 5 will bear against these inclined upper parts of the side-walls of the chip transport box and the clack 14 will clamp up the cover between itself and the inclined upper part of the end-wall, and this improves the retaining of the cover.

According to a second embodiment, FIGS. 2-4, the means for holding down the cover consists of a similar elongate plate or clack 30, which likewise is arranged at least at the upper edge of the front (in the normal direction of transport) end-wall 2 and which extends along this except for a short distance at each end thereof. The clack 30 is preferably bent to a substantially V-shaped cross-sectional profile in order to provide a better lever for the biasing rubber straps (will be further described below), and the clack is, in the outer end of the leg of the V-profile which in the upwardly swung position for the clack lies close to the end-wall, attached to the end-wall by means of hinges 31 which permit the clack to be swung inwardly over the chip transport box 1. A suitable number of rubber straps 32 or other biasing means bias the clack to an upwardly swung position where it is out of the way for the cover during the covering or uncovering of the upper side of the chip transport box.

A lever 18 is rigidly fastened to the outer end of the above mentioned leg of the V-profile of the clack, and in the outer free end of this lever a wire or pull-rod 19 is pivotally supported. The opposite end of the wire or pull-rod is in a similar way pivotally supported in an arm 20. The arm 20 is in its other end provided with a sleeve 25 which is pivotally journalled on a shaft 29 for carrying the swinging arm 6, and in this embodiment the shaft 29 carries the swinging arm 6 fixed against rotation at the front (in the normal direction of transport) end-wall 2 of the chip transport box. Furthermore, in this embodiment the shaft 29 is elongated so that it extends through the reinforcing beam 8, through the end-wall 2 of the chip transport box and into the chip transport box. A housing 21, in which the shaft 29 is rotatably supported, is welded on the beam and is also extended through the end-wall 2 of the chip transport box and into the chip transport box. A spacer 22 is arranged on the shaft 29 between the reinforcing beam 8 and the swinging arm 6 in order to prevent the latter from engaging the end-wall 2 of the chip transport box.

In the assembled state a portion of the free end of the shaft 29 projects out of the housing 21 and two axially spaced carrier rings 23 are bolted on to said portion of the shaft, and a carrier pin 24, which is preferably welded on to the carrier rings 23, extends between the carrier rings parallel to the shaft. In the space between these carrier rings 23 the end of the arm 20 which is provided with the sleeve 25 is arranged on the shaft 29.

In FIGS. 2 and 3 (full lines) the clack 30 is shown in an upwardly swung position where it is biased by rubber straps 32. When the cover 4 is brought across the chip transport box 1 the shaft 29 rotates in the housing 21 and thereby also rotating the carrier rings 23 and the carrier pin 24 fastened thereto. Hereby the carrier pin 24 is arranged in such a position in relation to the initial position of the arm 20, that the carrier pin does not engage the arm 20 until the cover 4 has been brought so far across the chip transport box that the clack 30 may start its swinging movement inwardly towards the top of the box without interfering with the continuing covering. Thus, when the carrier pin 24 engages the arm 20 a further covering of the cover 4, and thereby rotation of the shaft 29, causes the arm 20 to be carried along in this rotation and the result is that the arm 20 is swung downwardly to the left in FIG. 3. This movement is transmitted to the lever 18 through the wire or pull-rod 19 and the lever 18 rotates the clack 30 around its axis of rotation and the clack is swung inwardly towards the top of the chip transport box. When the covering is terminated and the swinging arm 6 accordingly is positioned as illustrated in FIG. 4 and with dotted lines in FIG. 3 the clack 30 clamps up the cover 4 against the top of the chip transport box 1. When the chip transport box is being uncovered the clack 30 is returned to its normal position by the rubber straps 32.

In an alternative to the embodiment described above the arm 20 is, as is shown in FIGS. 5 and 6, carried by the shaft 29 outside the end-wall 2 of the chip transport box and as a result of this the carrier pin 24, the pull rods 19 and the lever 18 are also arranged external of the chip transport box.

According to a third embodiment, see FIG. 7, the means for holding down the cover 4 consists of a clamping belt 27, preferably a nylon belt of the same kind as the pull-belt used for rolling up the cover on the shaft 5, which is located in a welt 26 at the short end of the cover 4. The nylon belt 27 is in one end fastened to the shaft 5 together with the cover 4. In the other end the nylon belt 27 is connected to a strong rubber band 28 or the like, which in turn is fastened to the side-wall of the chip transport box. When the cover 4 is brought across the chip transport box the nylon belt 27 is biased and the cover is forced down against the top of the chip transport box. Alternatively the clamping belt 27 may in itself be manufactured from a resilient material and in that case the clamping belt is attached directly to the side-wall of the chip transport box.

Thus, an arrangement according to the initially indicated objects has been provided.

What I claim is:

1. An arrangement for covering a chip transport box (1) comprising a cover (4) which is rolled up on and unrolled from a shaft (5) and a swinging arm (6) provided at each of two opposite walls in the chip transport box, whereby one end of the swinging arm is pivotally journalled at the respective wall (2), and at least one piston and cylinder unit (9,10) fastened to at least one of the swinging arms and to said wall (2) for swinging the swinging arms (6) and for extending the cover (4) across the chip transport box from one side thereof to the other, the swinging arms (6) in their other ends rotatably carrying the shaft (5) for swinging the same across the chip transport box when the swinging arms are operated by the piston and cylinder unit (9, 10), one end of the cover firmly fastened to the shaft (5), the other end thereof directly or indirectly attached to a first side wall of the chip transport box, a pull-belt (12) having one end attached to a second side wall of the chip transport box opposite said first side wall, the other end thereof adapted to be rolled up on and unrolled from the shaft (5) in a manner such that when the swinging arms (6) are operated, cover 4 is rolled up on shaft 5 as the pull-belt 12 is unrolled from shaft 5 and cover 4 is unrolled to cover the chip transport box 1 as the pull-belt 12 is wound to top shaft (5), and the cover (4) comprising resilient means (13, 4) which in the final stage of the unrolling of the cover are extended and act with a tensioning force on the cover whereby this is brought to close contact with the upper edges of the chip transport box.

2. Arrangement according to claim 1, characterized in that a resilient, biasing clamping belt (27) is provided at least in the front (in the normal direction of transport), free, edge of the cover (4), in that one end of the clamping belt (27) together with the cover (4) is fastened to the shaft (5) and in that the other end of the clamping belt (27) is directly or indirectly fastened to the side-wall of the ship transport box which corresponds to the initial position for the shaft (5) when the chip transport box (1) is uncovered.

3. Arrangement according to claim 2, characterized in that the clamping belt (27) consists of a band which in itself is substantially non-resilient and in that this band is connected to a rubber band (28) which is fastened to the side-wall of the chip transport box which corresponds to the initial position for the shaft (5) when the chip transport box (1) is uncovered.

4. An arrangement for covering a chip transport box (1) comprising a cover (4) which is rolled up on and unrolled from a shaft (5) and a swinging arm (6) provided at each of two opposite walls in the chip transport box, whereby one end of the swinging arm is pivotally journalled at the respective wall (2), and at least one piston and cylinder unit (9, 10) fastened to at least one of the swinging arms and to said wall (2) for swinging the swinging arms (6) and for extending the cover (4) across the chip transport box from one side thereof to the other, the swinging arms (6) in their other ends rotatably carrying the shaft (5) for swinging the same across the chip transport box when the swinging arms are operated by the piston and cylinder unit (9, 10), one end of the cover firmly fastened to the shaft (5), the other end thereof directly or indirectly attached to a first side wall of the chip transport box, a pull-belt (12) having one end attached to a second side wall of the chip transport box opposite said first side wall, the other end thereof adapted to be rolled up on and unrolled from the shaft (5) in a manner such that when the swinging arms (6) are operated, cover 4 is rolled up on shaft 5 as the pull-belt 12 is unrolled from shaft 5 and cover 4 is unrolled to cover the chip transport box 1 as the pull-belt 12 is wound on to shaft (5), the cover (4) comprising resilient means (13, 4) which in the final stage of the unrolling of the cover are extended and act with a tensioning force on the cover whereby this is brought to close contact with the upper edges of the chip transport box, a clack (14) pivotally attached to at least one (2) of the walls where the swinging arms (6) are located and at the upper edge thereof, the clack (14) biased to a position in which it is out of the way for the cover (4) during the covering and uncovering of the upper open side of the chip transport box (1) and the clack provided with means (17) which in the final stage of the application of the cover over the upper open side of the chip transport box (1) and in the beginning of its removal from the upper open side of the chip transport box (1) are actuated to fold down the clack (14) over the cover (4) and to permit the clack to return to the biased position respectively, whereby the clack (14) in the folded position clamps up the free edge of the cover (4) against the adjacent wall (2).

5. Arrangement according to claim 1 or 4, characterized in that the resilient means consist of the cover (4) itself which is manufactured from a resilient material.

6. Arrangement according to claim 1 or 4, characterized in that the resilient means consist of resilient bands (13) which with one end are connected to the cover (4) and which with their other ends are attached to the side of the chip transport box.

7. An arrangement for covering a chip transport box (1) comprising a cover (4) which is rolled up on and unrolled from a shaft (5) and a swinging arm (6) provided at each of two opposite walls in the chip transport box, whereby one end of the swinging arm is pivotally journalled at the respective wall (2), and at least one piston and cylinder unit (9, 10) fastened to at least one of the swinging arms and to said wall (2) for swinging the swinging arms (6) and for extending the cover (4) across the chip transport box from one side thereof to the other, the swinging arms (6) in their other ends rotatably carrying the shaft (5) for swinging the same across the chip transport box when the swinging arms are operated by the piston and cylinder unit (9, 10), one end of the cover firmly fastened to the shaft (5), the other end thereof directly or indirectly attached to a first side wall of the chip transport box, a pull-belt (12) having one end attached to a second side wall of the chip transport box opposite said first side wall, the other end thereof adapted to be rolled up on and unrolled from the shaft (5) in a manner such that when the swinging arms (6) are operated, cover 4 is rolled up on shaft 5 as the pull-belt 12 is unrolled from shaft 5 and cover 4 is unrolled to cover the chip transport box 1 as the pull-belt 12 is wound on to shaft (5), the cover (4) comprising resilient means (13, 4) which in the final stage of the unrolling of the cover are extended and act with a tensioning force on the cover whereby this is brought to close contact with the upper edges of the chip transport box, at least the front swinging arm (6) nonrotatably carried by an extended shaft (29) which in turn is pivotally journalled in a housing (21) which is rigidly mounted in the front end-wall (2), a carrier pin (24) arranged on the shaft (29) for actuating an arm (20), which is rotatably journalled on the shaft (29), in the final stage of the application of the cover (4) across the chip transport box (1) and this actuating of the arm (20) through a wire or pull-rod (19) transmitted to a lever (18) which is rigidly attached to the clack (30), which is pivotally attached to at least one of the walls where the swinging arms (6) are located, and at the upper edge thereof, and a clack (30) biased to a position where it is out of the way for the cover (4) when the chip transport box (1) is covered and uncovered.

8. Arrangement according to claim 7, characterized in that the clack (30) has a generally V-shaped cross-sectional profile.

* * * * *